United States Patent [19]

Munter

[11] 4,103,108
[45] Jul. 25, 1978

[54] CIRCUIT AND METHOD FOR DIGITALLY MEASURING SIGNAL LEVELS OF PCM ENCODED SIGNALS

[75] Inventor: Ernst August Munter, Ottawa, Canada

[73] Assignee: Northern Telecom Limited, Montreal, Canada

[21] Appl. No.: 774,381

[22] Filed: Mar. 4, 1977

[51] Int. Cl.$^2$ ............................................. H04J 3/14
[52] U.S. Cl. ............................. 179/15 BF; 324/76 A
[58] Field of Search .................. 179/15 BF; 324/76 A

[56] References Cited

U.S. PATENT DOCUMENTS

| | | | |
|---|---|---|---|
| 3,683,115 | 8/1972 | Schellenberg | 179/15 BF |
| 3,798,635 | 3/1974 | Candiani | 179/15 BF |
| 3,823,269 | 7/1974 | Saito | 179/15 BF |

Primary Examiner—David L. Stewart
Attorney, Agent, or Firm—Frank Turpin

[57] ABSTRACT

A digital circuit for the level measurement of PCM signals representing an analogue signal and encoded in accordance with a predetermined companding law comprising a selector circuit having position $0-n$ for selecting integers between $0 - n$; a sampling circuit for successively sampling the input PCM signal $2^n$ times, $n$ being determined by the selector circuit; a connector circuit for converting each of the samples to its normalized power representation and for computing the average power of the samples; and means for determining the signal level equivalent of said average power in a conventional representation of power levels.

7 Claims, 3 Drawing Figures

CIRCUIT AND METHOD FOR DIGITALLY MEASURING SIGNAL LEVELS OF PCM ENCODED SIGNALS

This invention relates generally to pulse code modulation (PCM) systems and more particularly to a novel digital circuit for measuring the signal level of a PCM signal.

In conventional communication systems, such as the telephone system, it is usually necessary to determine the signal level on a transmission path as a measure of quality of performance. There are a number of approaches to determining the signal levels. One method consists in transmitting an analogue test signal of predetermined frequency and characteristic from one switching centre to another where the received signal is compared with the transmitted signal and a resulting signal level is determined. Another approach uses a loopback method whereby the test signal is looped back to the originating switching centre where the comparison is made. A variety of well known analogue measuring circuits and techniques have been developed to perform this function.

The communication systems presently being developed use digital encoding techniques such as PCM and time division multiplexing. In these systems the information appearing on both the switching and transmission paths is in digital form. However, the requirement of measuring the level of the signals on these paths is still present. Since the known measuring circuits and devices use analogue techniques, it is necessary to convert the digital signals into their analogue equivalent in order to measure the signal level thereof. This technique, although workable, is awkward, fairly complex and tends to be prohibitively expensive due to the necessity of providing highly accurate digital to analogue conversion equipment specifically for this purpose.

The invention provides a circuit for the direct digital measurement of signal levels of a PCM encoded signal, thereby obviating the necessity of providing digital to analogue conversion equipment for that purpose. In the context of this application the "signal level of a PCM signal" should be taken to mean the signal level of an analogue signal into which this PCM signal would be decoded using a reference analogue to digital converter. In addition, the circuit of the invention may be implemented with a relatively small number of off-the-shelf integrated circuit components.

In accordance with the invention there is provided a digital circuit for measuring the level of a PCM signal representing an analogue signal and encoded in accordance with a predetermined companding law comprising a selector means having positions $0-n$ for selecting integers between 0 and $n$; a sampling circuit for successively sampling the input PCM signal $2^n$ times, $n$ being determined by the selector means; means for converting each of the coded samples to its normalized power representation and for computing the average power of the samples; and means for determining the signal level equivalent of said average power in a conventional representation of power levels.

Also in accordance with the invention, there is provided a method for measuring the signal level of a PCM signal using the digital measuring circuit of the invention.

The unit dBm is used for the expression of power levels in decibels with reference to a power of 1 milliwatt (0.001 watt). The decibel is 10 times the logarithm to the base 10 of the ratio of a measured power $P_1$ and a reference power $P_r$ such that $dB = 10 \log_{10}(P_1/P_r) = 10 \log_{10}(P.\text{ watts}/0.001 \text{ watts})$. The units dBmO is as above but it defines an arbitrary zero point. By international recommendation, the zero point of a PCM signal representing a 1KHz tone is defined as being comprised of the following samples (mu $-225$ companding code) : $+97, +116, +116, +97, -97, -116, -116, -97$.

An example embodiment of the invention will now be described in conjunction with the drawings in which.

Figure 1:
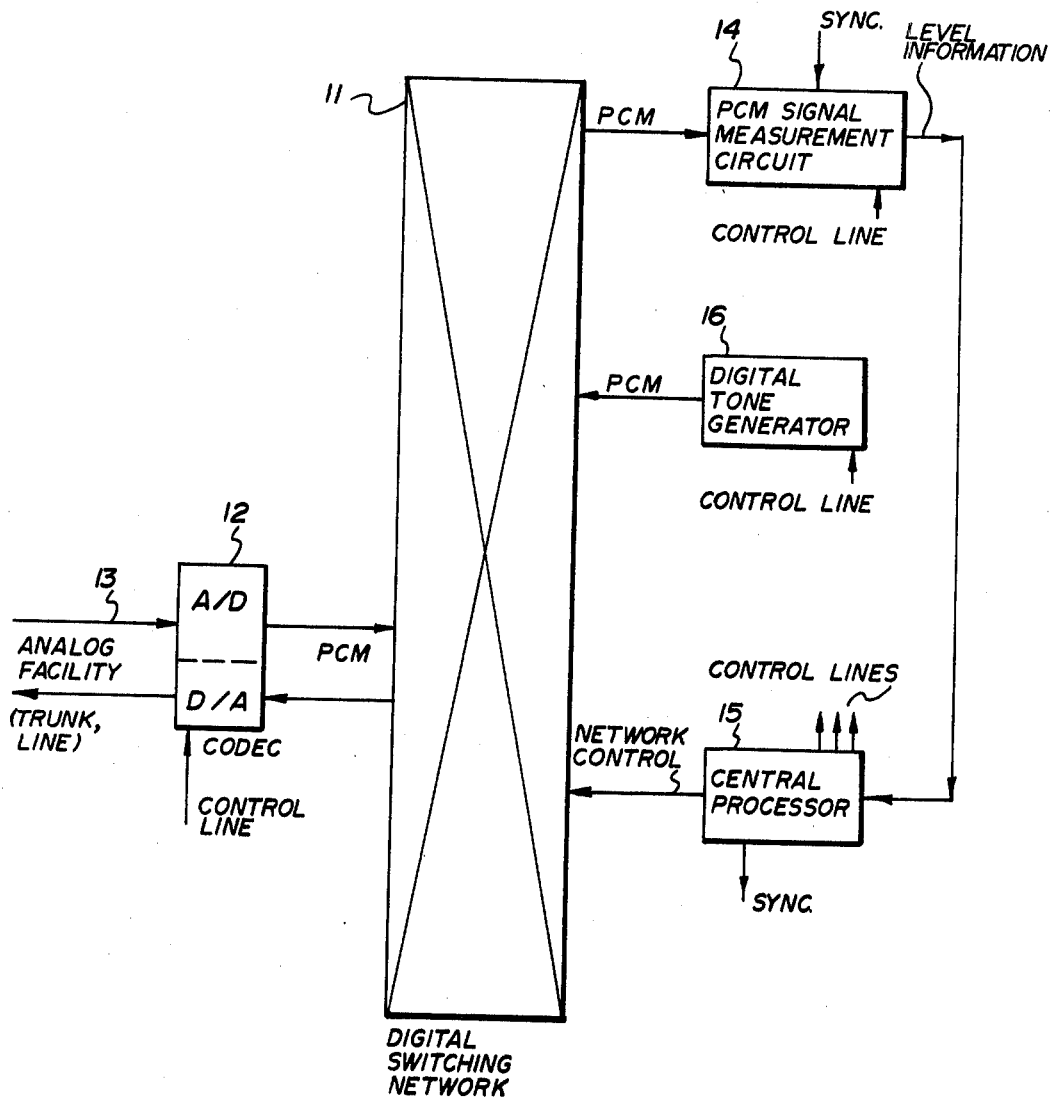
FIG. 1 is a block diagram of a portion of a PCM telephone switching system.

The block diagram of FIG. 1 illustrates a use for the circuit of the invention in a PCM telephone switching system. There is shown a digital switching network 11 having input ports for connection to a codec which contains analogue to digital and digital to analogue conversion circuitry; the codec in turn being connected to an analogue transmission facility 13. The digital switching network 11 is also provided with an output port connected to a PCM signal measurement circuit 14 which has an output terminal for transmitting resultant level information to a central processor 15.

The circuit of FIG. 1 portrays the use of the digital circuit 14 for the measurement of a PCM signal in the determination of the charcteristics of analogue interface subsystems from analogue to digital and digital to analogue points in digital switching systems.

The central processor 15 selects the facility to be tested. In the case of the codec 12, and the analogue facility 13, the central processor 15 causes the digital switching network 11 to provide a digital connection or path from the codec 12 to the PCM signal measurement circuit 14. Since the digital path through the switching network 11 passes PCM signals essentially unchanged, the codec 12 is in effect connected directly to the measurement circuit 14. In operation, a test signal may originate at a distant switching network and be transmitted along the analogue facility 13. The signal is converted from analogue to digital format in the A/D portion of the codec 12 and then sent through the digital switching network 11 to the PCM signal measurement circuit 14 which measures the level of the signal. The resultant information may be displayed on a visual display or sent to the central processor 15 for further processing.

The process is similar to that above if just the codec 12 is to be tested, except that the test tone originates from the digital tone generator 16 and that the analogue facility 13 is looped back on itself. As is conventional in the art, the central processor 15 is adapted to provide the necessary control signals to the circuits of the system.

Figure 2:
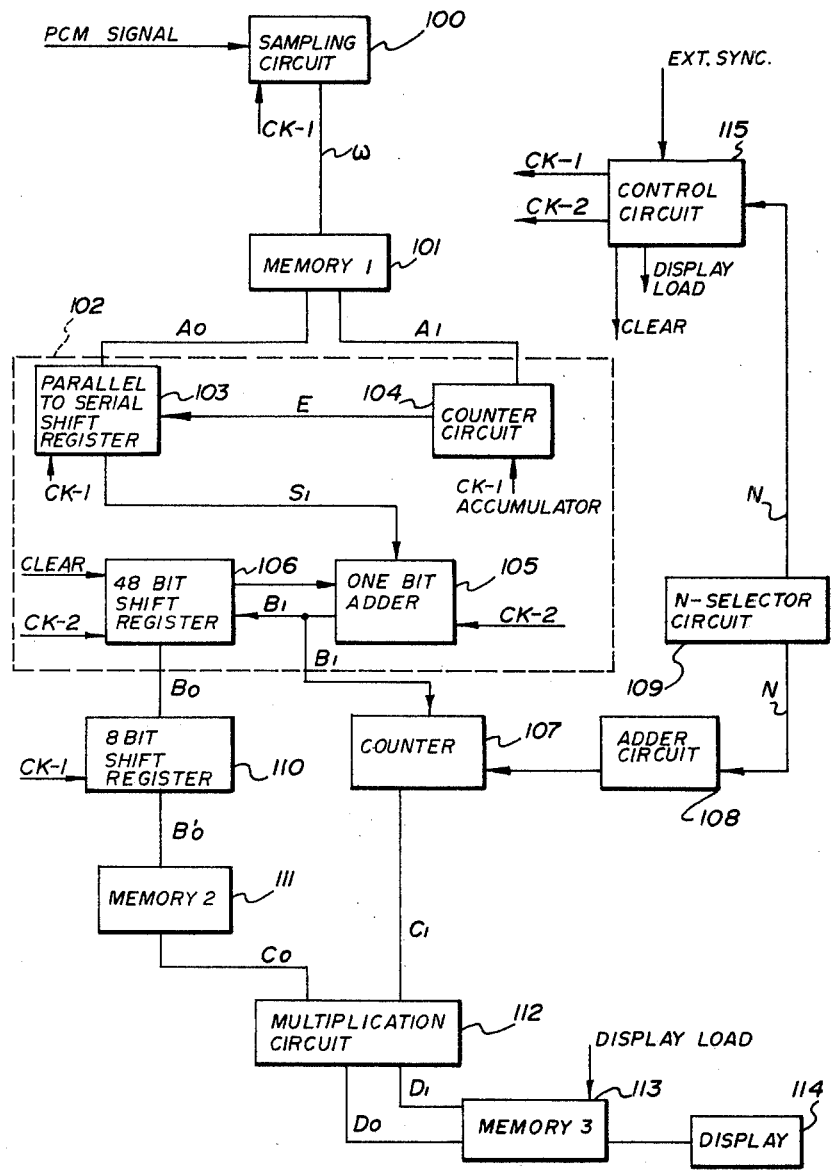
FIG. 2 is a block-schematic diagram of a digital measurement circuit in accordance with the invention.

FIG. 2 is a block-schematic diagram of a PCM signal level measurement circuit such as may be used in the system of FIG. 1. A sampling circuit 100 is shown as having an input terminal for receiving a serial PCM input signal. The sampling circuit 100 may consist of a commercially available shift register adapted to perform serial to parallel conversion of data and an output register. Its output terminal is connected to a memory means 101 which may conveniently be a read-only-memory (ROM). The memory means 101 accepts an input signal W consisting of eight bits, seven quanitity bits plus a sign bit and provides an output signal of 12 bits divided into a seven bit mantissa signal $A_o$ and a five bit exponent signal $A_1$. The sign bit connection may be omitted if the PCM-code format is of the sign and magnitude type where equal valued positive and negative samples differ only in the sign bit. These signals constitute the square of the linear representation of the instananeous power of the input signal W.

The output terminals of the memory means 101 are connected to an accumulator 102 having two input terminals. The accumulator 102 consists of a parallel to serial shift register 103, a single synchronous counter 104, a one bit adder 105, and a 48 bit shift register 106.

The output signal $A_o$ from the memory means 101 is converted from parallel to serial format in the shift register 103 and the output terminal thereof is connected to the one bit adder 105. The output signal $A_1$ from the memory means is provided to the counter 104 which counts the value of the signal $A_1$ and produces an output pulse E which enables shift register 103 to send a signal $S_1$ to the one bit adder 105. The one bit adder 105 is responsive to inputs from the 48 bit shift register 106 and signal $S_1$ from the parallel to serial shift register 103 for allowing the 48 bit shift register to be incremented by the value of the signal $S_1$. The serial output signal $B_1$ from the one bit adder 104 is also the serial output signal $B_1$ of the accumulator 102. The 48 bit shift register is responsive to the signal $B_1$ for producing a parallel output signal $B_o$ which is also the parallel output signal $B_o$ of the accumulator 102.

The counter 104 is responsive to signal $A_1$ for producing an enable signal after a predetermined count corresponding to the value of the exponent as represented by the signal $A_1$. The parallel to serial shift register 103 converts the signal $A_o$ from its parallel format to serial format. The serial format output signal $S_1$ is inhibited until the enable signal E is provided by the counter 104. The serial output signal $S_1$ of the parallel to serial shift registor 103 is provided to the adder 105 where it is added bit by bit to the contents stored in 48 bit shift register 106. The addition of a sample to the accumulated partial sum takes place during a 48 bit shift of the 48 bit shift register. The delay introduced by counter 104 allows the new sample to be added to the partial sum in the 48 bit shift register with the proper significance.

A selector circuit 109 determines $n$ which defines the number of samples $2^n$. The output signal $n$ is provided to the control circuit 115 for causing it to generate the necessary control signals and to the adder circuit 108 which adds the signal to counter 107 thereby presenting the counter with the value $n$. The counter 107 is also responsive to signal $B_1$ and provides an output signal $C_1$.

A shift register 110 acts as an output buffer for the 48 bit shift register 106. Connected to the output terminal of the shift register 110 is a second memory means 111. The output signal $C_o$ of the memory means 111 and the output signal $C_1$ of the counter 107 are provided to a multiplication circuit 112 (described further below). Output terminals of the multiplication circuit 112 are connected to a memory means 113 which functions as a binary code to BCD converter. Memory means 111 and 113 may conveniently be read-only-memories. The output signal D from the multiplication circuit 112 consists of a fractional component $D_o$ in a seven bit binary format and as integer component $D_1$ in a seven bit binary format plus one sign bit. The signals are converted to BCD format in the memory 113 wherein each memory location contains the BCD representation of its respective address, each of the addresses corresponding to a possible one value of the D signal. The output terminal of the BCD converter may be connected to a visual display 114 or to a central processor 15 as shown in FIG. 1.

The control circuit 115 is responsive to an external sync signal from the central processor and to the signal $n$ for providing the necessary control signals. The control circuit has four outputs, two clock signals, clock 1 and clock 2, display load and accumulator clear. Clock 2 signal runs 48 times as fast as clock 1 and is used for the timing needed in the accumulator 102. Clock 1 starts the sampling process in sampling circuit 100. The display load enables the memory 113 to provide an output signal to the display 114 after $2^n$ samples.

DESCRIPTION OF OPERATION

Figure 3:
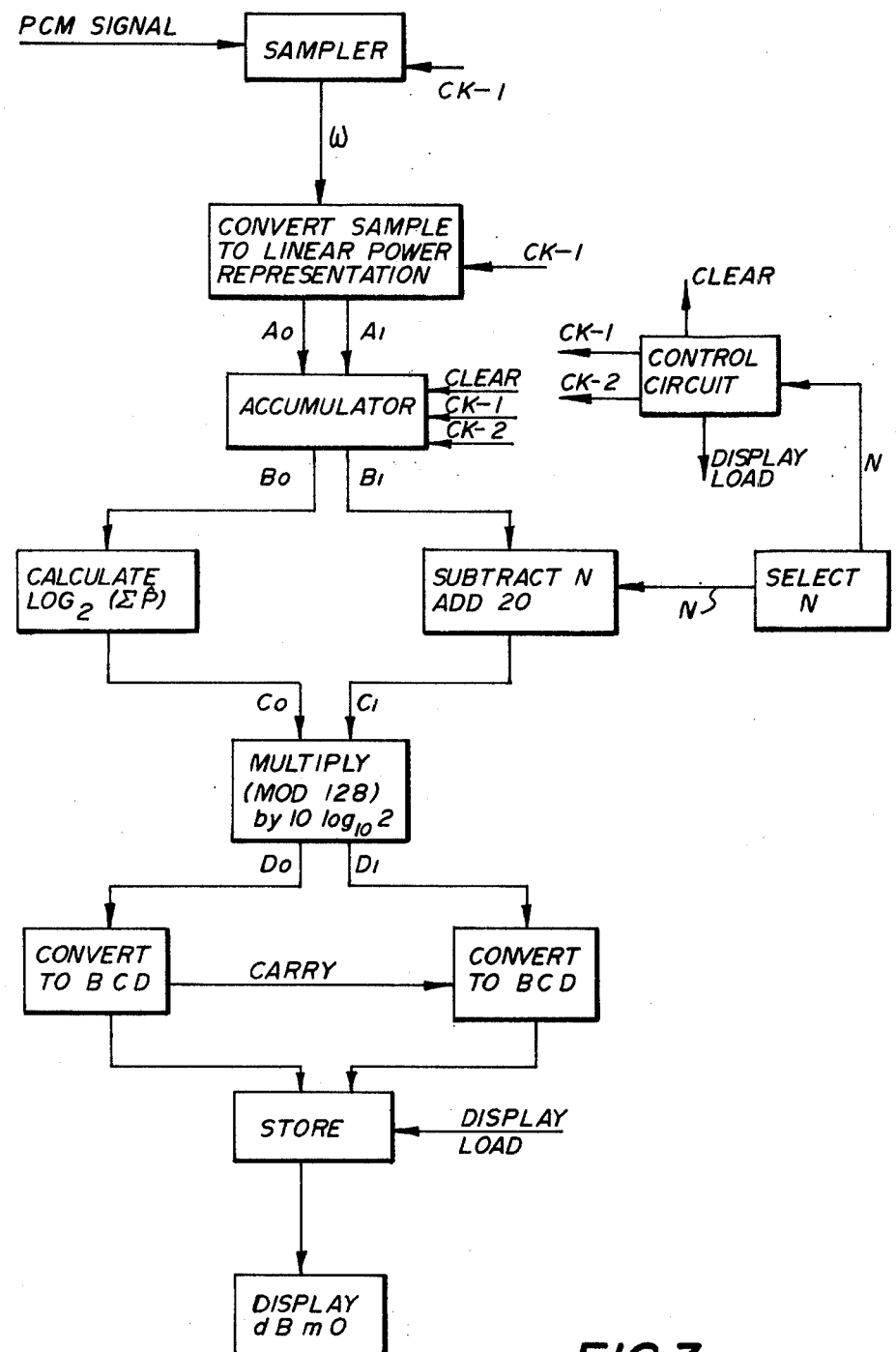
FIG. 3 is a functional sequence diagram of the circuit of FIG. 2.

The operation of the circuit of FIG. 2 will now be described in conjunction with the functional sequence diagram of FIG. 3.

As described earlier, the circuit samples a PCM channel on which there is a PCM signal representing an analogue signal. The test tone that defines OdBmO consists of the sequence of the following code samples of a 1 KHz signal:

+97, +116, +116, +97, −97, −116, −116, −97

The number of samples, designated as $n$, may be carried from $2^0$ to $2^{15}$ (1 − 32768) in steps of factors of two, and the corresponding integration time varies from 0.125 msec to 4sec. The value of $n$ is selectable by the selector circuit 109 which has positions 0 − 15.

An 8 bit serial sample is acquired by sampling circuit 100 from the serial PCM stream and converted to its parallel form W. The value of W is converted by the memory means 101 to a 12 bit word denoting normalized power such that $$K \times Y^2 = (A_o/64) \times 2^{A_1}$$

where
$A_o = $ 7 bit fraction, normal range 64 to 127 $A_1 = $ 5 bit exponent, range 0 − 24
  $K = $ 0.37012, a constant derived to facilitate later conversion to dBm.
  $W = $ PCM code sample range 0 ± 8031
  $Y = $ decoded value of the PCM code sample W Y is not seen as a signal due to the way memory means 101 operates. Y and W are related through the $\mu$-256 companding law. CCITT Recommendation G.711, 1972 revised 1976 gives the elements of the $\mu$ companding law.

The value of the sample W is used as the address of the memory means 101 to determine its corresponding normalized power. In this way it is not necessary to have hardware to perform the above calculation for every sample and Y does not exist as a signal. This is made possible by the finite range of values expected.

The accumulated sum of power samples is stored in linear form in the accumulator 102 as described earlier, by the 48 bit shift register 106.

After the power of $2^n$ samples, as determined by the selector circuit 109, has been accumulated, output signal $B_o$ and output signal $B_1$ are available. The total output signal has a resolution of 15 bits, the fraction $B_o$ has 9 bits and the exponent $B_1$ has 6 bits.

The accumulated sum of power is expressed as:

$$\Sigma P = (B_o/256) \times 2^{B_1}$$

ranges
$b_o = 256$ to $511$
$B_1 = 0 - 39$

The fraction $B_o$ is converted to its $\log_2$ representation $C_o$, in the second memory means 111. The integer $B_1$ is modified by subtracting N in the counter 107. This is equivalent to dividing the power sum by $2^n$, to give the average power. A constant of 20 is added in said counter 107 to shift the range of the exponent upwards to facilitate subsequent decoding. The average power is now expressed by:

$$\hat{P} = \frac{2^{20}}{2^n} \times \Sigma P = 2 \exp(C_1 + \frac{C_o}{256})$$

and the binary log $$\log \hat{P} = C_1 + (C_o/256)$$

ranges
$= C_o = 0$ to $225$;
$C_1 = 5$ to $44$

To convert the values of C to dBm, C is multiplied by the constant $10 \times \log_{10} 2$ which is very close to $3 + (3/256)$. Multiplication is accomplished in the multiplication circuit 112.

As is well known in the art an implementation of such a multiplier may consist of two parallel adder stages, the first stage forming:

$$C^1 = C + (C/256)$$

where $$C = C_o + C_1$$

which is obtained by connecting the signal path C to one set of the input terminals of the adder directly and connecting the signal path of C to the second set of input terminals of the adder in such a way that the signal C appears at the said second set of input terminals shifted 8 bits to the left. The output D is obtained by analogously combining $C^1$ and $2C^1$ in the second adder stage to give:

$$D = C^1 + 2C^1$$
$$= 3C^1$$
$$= 3C + (3/256)C$$
$$= (3 + 3/256) \times C$$

where
$$D = D_o + D_1$$

The resultant power level number (dBm) has a value between 15 and 135 with the foregoing constants having been chosen to result in 128 for OdBmO (i.e. the test tone). Thus by evaluating the result of the multiplication modulo 128 in the multiplication circuit 112 the sign bit is obtained.

The magnitude of the power level in dBmO is available as a 14 bit number with seven fractional bits $D_o$ and seven integer bits $D_1$. The fractional $D_o$ and integer $D_1$ bits are independly converted to Binary Coded Decimal (BCD) using the memory means 113.

The value in BCD has a range of $-99.9$ to $6.9$ dBmO and may be displayed on the visual digital display means 114 or processed further as mentioned above.

What is claimed is:

1. A digital circuit for measuring the level of a PCM signal representing an analogue signal and encoded in accordance with a predetermined companding law, comprising:
    a selector means having positions $0-n$;
    a sampling circuit for successively sampling said PCM signal $2^n$ times, $n$ being determined by said selector means;
    means for converting each of said samples to its normalized power representation;
    means for computing the average power of said samples; and
    means for determining the power level number of said average power.

2. A digital circuit as defined in claim 1 wherein said converting means is a first memory means wherein each location contains the square of the linear representation of its respective address, each of the addresses corresponding to a possible one of said coded samples.

3. A digital circuit as defined in claim 2 wherein said computing means comprises:
    an accumulator circuit responsive to the output signals from said first memory means and to clock signals from a control circuit for producing first and second output signals, said first output signal being a parallel data word consisting of the eight most significant bits of the accumulated sum of the normalized power of said samples, and said second output signal being a data word representing the position of the most significant one of said accumulated sum;
    a second memory means having a plurality of storage locations each containing the $\log_2$ value of its respective address, each of the addresses corresponding to a possible one of said first signals;
    means for addressing said second memory means at the address defined by said first signal; and
    circuit means for producing a third output signal representing the exponent value of the average normalized power of said samples.

4. A digital circuit as defined in claim 3 wherein the circuit means comprises, a counter circuit responsive to said second signal for producing said third output signal corresponding to the exponent value thereof on the basis of the value of the most significant bit of said second output signal and said counter means also being responsive to a signal from said selector means for subtracting the value of $n$ from said third signal, whereby said third signal represents the average normalized power of said samples.

5. A digital circuit as defined in claim 3 wherein said accumulator circuit comprises:
    a counter circuit responsive to the exponent portion of the output signal from the first memory means for providing an enable signal after a predetermined count as determined by said exponent portion;
    a parallel to serial shift register adapted to be loaded with the mantissa portion of the output signal from the first memory means, and responsive to said enable signal for providing a serial output signal of its contents;
    a shift register and an adder circuit for determining the accumulated sum of said mantissa portions of said $n$ samples.

6. A digital circuit as defined in claim 4 wherein the means for determining the power level number of said average power is a pair of multiplication circuits, one for providing the product of said third output signal and a conversion constant, and the other for providing the product of the output signal from the second memory means and said conversion constant.

7. A digital circuit as defined in claim 6 and further comprising a converter circuit for combining and converting the output signals from the multiplication circuits into the binary coded decimal equivalent and a visual display means for viewing the output signal thereof.

* * * * *